United States Patent [19]
Shapiro

[11] Patent Number: 6,067,482
[45] Date of Patent: May 23, 2000

[54] LOAD SHIFTING CONTROL SYSTEM FOR COMMERCIAL REFRIGERATION

[75] Inventor: Doron Shapiro, St. Louis, Mo.

[73] Assignee: Hussmann Corporation, Bridgeton, Mo.

[21] Appl. No.: 09/227,986

[22] Filed: Jan. 8, 1999

[51] Int. Cl.[7] .............................. H02J 1/10; H02J 3/00
[52] U.S. Cl. .................. 700/286; 700/297; 700/276; 307/64
[58] Field of Search .................... 700/286, 295, 700/276; 307/64, 44

[56] References Cited

U.S. PATENT DOCUMENTS

| | | | |
|---|---|---|---|
| 1,226,534 | 5/1917 | King ........................................... | 307/59 |
| 1,457,052 | 5/1923 | Birch .......................................... | 307/59 |
| 1,699,762 | 1/1929 | Smith ................................... | 273/121 R |
| 3,987,308 | 10/1976 | Burch ......................................... | 307/41 |
| 4,153,936 | 5/1979 | Schmitz et al. ......................... | 700/296 |
| 4,160,917 | 7/1979 | Wald ......................................... | 307/64 |
| 4,731,547 | 3/1988 | Alenduff et al. .......................... | 307/85 |
| 4,940,079 | 7/1990 | Best et al. ................................ | 165/236 |
| 5,181,180 | 1/1993 | Munro ...................................... | 700/297 |
| 5,432,710 | 7/1995 | Ishimaru et al. ......................... | 700/493 |
| 5,500,561 | 3/1996 | Wilhelm .................................... | 307/64 |
| 5,621,254 | 4/1997 | Takeda et al. ............................ | 307/64 |
| 5,816,491 | 10/1998 | Berkeley et al. ......................... | 307/39 |
| 5,880,536 | 3/1999 | Mardirossian ........................... | 700/286 |

*Primary Examiner*—William Grant
*Assistant Examiner*—Kidest Bahta
*Attorney, Agent, or Firm*—Richard G. Heywood

[57] ABSTRACT

A load shifting control system for selectively allocating a plurality of discrete electrical loads between a first power source and a second power source includes a plurality of transfer switches connected to respective electrical loads and further includes a processor coupled with the transfer switches. The processor is configured to identify presently available combinations of the discrete loads and to select a preferred one of the presently available load combinations as a function of control parameters and/or demand data provided to the processor. The processor is also configured to generate control signals corresponding to the preferred load combination and to communicate the control signals to the transfer switches, which are adapted to effect an allocation of loads between the power sources in accordance with the preferred load combination upon receiving the control signals.

58 Claims, 13 Drawing Sheets

FIG. 10

| COMB. NO. (DECIMAL) | COMB. NO. (BINARY) | LOAD 4 KW | LOAD 3 KW | LOAD 2 KW | LOAD 1 KW | TOTAL LOAD ON GENERATOR IF THIS COMBINATION OF TRANSFER SWITCHES IS USED | COMMENT |
|---|---|---|---|---|---|---|---|
| 0 | 0000 | 0 | 40 | 60 | 65 | N/A | NO LOADS WOULD BE CONNECTED TO GENERATOR |
| 1 | 0001 | 0 | 40 | 60 | 65 | 65 | ELIMINATED, LESS THAN MIN. NEW LOAD |
| 2 | 0010 | 0 | 40 | 60 | 65 | 60 | ELIMINATED, LESS THAN MIN. NEW LOAD |
| 3 | 0011 | 0 | 40 | 60 | 65 | 60+65=125 | THIS COMBINATION SELECTED |
| 4 | 0100 | 0 | 40 | 60 | 65 | 40 | ELIMINATED, LESS THAN MIN. NEW LOAD |
| 5 | 0101 | 0 | 40 | 60 | 65 | 40+65=105 | ELIMINATED, LESS THAN MIN. NEW LOAD |
| 6 | 0110 | 0 | 40 | 60 | 65 | 40+60=100 | ELIMINATED, LESS THAN MIN. NEW LOAD |
| 7 | 0111 | 0 | 40 | 60 | 65 | 40+60+65=165 | ELIMINATED, TOTAL LOAD HIGHER THAN COMBINATION 3 |
| 8 | 1000 | 0 | 40 | 60 | 65 | 0 | ELIMINATED, LOAD 4 IS OFF (0 KW) |
| 9 | 1001 | 0 | 40 | 60 | 65 | 0+65=65 | ELIMINATED, LOAD 4 IS OFF (0 KW) |
| 10 | 1010 | 0 | 40 | 60 | 65 | 0+60=60 | ELIMINATED, LOAD 4 IS OFF (0 KW) |
| 11 | 1011 | 0 | 40 | 60 | 65 | 0+60+65=125 | ELIMINATED, LOAD 4 IS OFF (0 KW) |
| 12 | 1100 | 0 | 40 | 60 | 65 | 0+40=40 | ELIMINATED, LOAD 4 IS OFF (0 KW) |
| 13 | 1101 | 0 | 40 | 60 | 65 | 0+40+65=105 | ELIMINATED, LOAD 4 IS OFF (0 KW) |
| 14 | 1110 | 0 | 40 | 60 | 65 | 0+40+60=100 | ELIMINATED, LOAD 4 IS OFF (0 KW) |
| 15 | 1111 | 0 | 40 | 60 | 65 | 0+40+60+65=125 | ELIMINATED, LOAD 4 IS OFF (0 KW) |

LOAD SHIFTING CONTROL SYSTEM FOR COMMERCIAL REFRIGERATION

BACKGROUND OF THE INVENTION

The present invention is directed to a load shifting control system and, more particularly, to a control system for selectively allocating a plurality of discrete electrical loads between a first power source and a second power source.

Electrical utility companies frequently approach and occasionally surpass their maximum generating capabilities during peak demand periods. Consequently, these utilities commonly assess seasonal demand penalties based on each customer's peak level of usage during the billing period. In response, electrical utility customers have employed a number of practices to avoid such penalties. Both commercial and residential customers can reduce or "shave" their peak usage and thus their peak demand charge by shifting some of their peak demand to non-peak time periods, by eliminating unnecessary peak demand altogether or by shifting some of their peak demand to a secondary power source such as a generator or fuel cell.

Supermarkets are among the electrical utility customers which stand to benefit from shifting part of their peak demand to a secondary power source. The domestic supermarket industry accounts for approximately 4% of all electrical energy consumed in the United States. Moreover, the industry relies almost exclusively upon electrical energy to power its refrigeration systems, which account for about half of the total supermarket energy consumption. Furthermore, most supermarkets have a relatively low marginal income (less than 1% of sales) and are thus particularly motivated to reduce operating expenses (e.g., energy consumption) as a percentage of sales.

In the summertime, for example, peak usage generally occurs on weekday afternoons when the demand for air conditioning and refrigeration is greatest. However, natural gas consumption and pricing are relatively low during summer months when heating requirements are limited. Therefore, load shifting using natural gas as an alternate energy source not only reduces costs for utility customers but also benefits both electrical utilities (by reducing peak capacity requirements) and suppliers of natural gas (by increasing demand during summer months).

Many utility customers, and nearly all supermarkets, have access to a secondary source of power such as an on-site generator purchased for use as an emergency power source in the event of a power outage. A privately-owned secondary power source may also be used to supplement the power purchased from an electrical utility. While a customer's peak demand charge can be reduced by shifting part of the peak demand to a secondary generator, the customer must closely compare the cost of generating power with the cost of purchasing power from the electrical utility to maximize net savings because these costs can vary dramatically from hour to hour. In fact, if the customer does not closely monitor these costs, a reduction in the customer's peak demand charge could be negated, or the overall cost could be greater than if no supplemental power were used.

As an example, a supermarket could satisfy its peak demand by supplementing the power it purchases from the electrical utility with a secondary generator (e.g., a synchronous generator or an inductive generator) operated in parallel with the utility and controlled to produce only the amount of power necessary to maintain the supermarket's peak demand at or below a predetermined value. In other words, the supermarket could employ a single power distribution network in which two parallel power sources entirely service a single load (i.e., the supermarket's entire energy requirements). Furthermore, the supermarket could provide one or more additional generators to entirely service the needs of a particular discrete portion of its energy requirements. That is, the supermarket could employ one or more additional power distribution networks each having a generator (other than the one in parallel with the utility) which is dedicated to and entirely services a particular portion of the load.

However, there are several important drawbacks and limitations associated with the example discussed above. First, parallel operation of synchronous generators is potentially dangerous because it is possible to electrocute utility workers if there is a power outage. Second, reducing the danger associated with parallel synchronous generators may be relatively expensive because it requires the purchase and installation of costly circuit protection hardware such as isolation switch gear. Further, inductive generators have the significant drawback that they are not capable of operating as standby-by power sources. Moreover, the approach of using a synchronous generator to service only a particular load(s) lacks flexibility in that it involves single load power distribution networks which cannot dynamically load and unload a secondary power source in response to changing economic factors. In contrast, by combining multiple discrete loads to create relatively small generator loading steps, it is possible for a control system to dynamically load and unload a generator to maximize net savings. Thus, there is a need for a less cumbersome and less expensive load shifting control system for reducing a utility customer's peak demand by dynamically allocating a plurality of discrete loads between two or more power sources which are independent of and isolated from one another.

As mentioned above, a number of economic factors may dictate the manner in which a utility customer allocates its load between a utility and a secondary power source such as a generator. When the energy charge (i.e., dollars per kilowatt-hour) of the electric utility is less than an on-site power source, the entire load should be connected to the utility except for peak shaving purposes (i.e., if the utility assesses a peak demand charge). By contrast, when the cost of generating electrical energy (i.e., KW-hours) is lower than the cost of purchasing it from the public utility, the customer's load should be shifted to the generator up to the maximum load capacity of the generator except to the extent certain factors dictate otherwise (e.g., where reducing the generator run time maximizes net savings due to lower maintenance costs). In many geographic areas, the relevant economic factors vary considerably over time such that the electric utility is the less expensive energy source sometimes, and the generator is the less expensive energy source other times. Accordingly, there is a need for a load shifting control system capable of periodically evaluating the relevant economic factors and selectively shifting a utility customer's discrete loads between at least two power sources in response to changing economic factors. In this regard, it is important to know the actual demand associated with each of the discrete loads because the actual demand will not always equal the "rated" demand assigned to a particular load. Thus, there is also a need for a load shifting control system capable of accurately determining the actual demand associated with each of the discrete loads.

SUMMARY OF THE INVENTION

Among the several objects and features of the present invention may be noted the provision of a processor and a method for selecting a combination of discrete electrical loads from a plurality of presently available load combinations representing various allocations of the loads between first and second power sources based on a number of economic factors; to provide such a processor and/or method which combines multiple discrete loads to create relatively small loading steps for the power sources; to provide such a processor and/or method capable of implementing either a peak shaving mode or a generator loading mode in response to changing economic factors; to provide such a processor and/or method capable of selecting a load combination which maximizes net savings without overloading the generator; to provide such a processor and/or method for selecting a load combination which reduces peak demand requirements for utilities and which reduces peak demand charges for utility customers; to provide such a processor in connection with a control system capable of effecting an allocation of loads in accordance with the selected load combination; to provide such a processor and/or method capable of allocating loads between two power sources both for load shifting purposes and for emergency backup purposes; to provide such a processor and/or method which more accurately determines the actual demand associated with each load; and to provide such a processor adapted to be coupled with a plurality of transfer switches connected to respective electrical loads such that each load is connected to the one power source and disconnected from the other power source.

Further among the several objects may be noted the provision of a control system which maintains the first power source independent of and isolated from the second power source; and the provision of such a control system and/or a commercial refrigeration system which includes a processor having the advantages enumerated above.

Briefly, the present invention is directed to a processor for distributing electrical power in a commercial refrigeration environment by selecting a preferred combination of discrete electrical loads from a plurality of presently available load combinations and allocating it to one of two power sources. The processor of the present invention comprises means for receiving control parameters and/or demand data associated with the discrete loads and the power sources, memory means for storing the control parameters and/or demand data, and means for calculating a target demand value for the demand on one of the power sources as a function of the control parameters and/or demand data. The processor also includes means for identifying each of the presently available load combinations and means for selecting one load combination from the presently available load combinations. The selecting means calculates a load demand value for each of the presently available load combinations and selects the load combination having the highest load demand value which does not exceed the target demand value.

In another aspect, the present invention is directed to a control system for selectively allocating a plurality of discrete electrical loads between a first power source and a second power source. The control system of the present invention comprises a plurality of transfer switches connected to respective electrical loads and a processor coupled with the transfer switches. The transfer switches are operable between a first position in which the load is connected to the first power source and disconnected from the second power source and a second position in which the load is disconnected from the first power source and connected to the second power source. The processor is configured to compare the presently available load combinations and to select a preferred one of the presently available load combinations as a function of control parameters and/or demand data provided to the processor. Additionally, the processor is configured to generate control signals corresponding to the preferred load combination and is further configured to communicate the control signals to the transfer switches. The transfer switches are adapted to effect an allocation of loads between the first and second power sources in accordance with the preferred load combination upon receiving the control signals.

In yet another aspect, the present invention is directed to a method for selecting a combination of discrete electrical loads from a plurality of presently available load combinations. The method of the present invention comprises providing control parameters and/or demand data associated with the discrete loads and the power sources to a processor, storing the control parameters and/or demand data in a memory associated with the processor, calculating a target demand value for the demand on one of the power sources as a function of the control parameters and/or demand data, and identifying the presently available load combinations. The method also includes selecting one load combination from the presently available load combinations by calculating a load demand value for each of the presently available load combinations which indicates the actual demand for that load combination on said one power source and determining which of the presently available load combinations has the highest load demand value which does not exceed the target demand value.

In a still another aspect, the present invention is directed to a commercial refrigeration system capable of allocating electrical loads in a store between at least two power sources. The commercial refrigeration system of the present invention comprises a compressor having an associated electrical load when running, a condenser, and an evaporator disposed in a product cooling zone for cooling displayed product. The compressor, condenser, and evaporator are coupled with one another in a first refrigeration system in the store. The commercial refrigeration system also has a plurality of electrical loads including the electrical load associated with the compressor. The system further includes transfer switch means coupled with the electrical loads and adapted for selectively switching at least some of the electrical loads from one of the power sources to another. The commercial refrigeration system still further includes a processor coupled with the transfer switch means and configured to identify a plurality of presently available combinations of electrical loads and to select a preferred one of the presently available load combinations as a function of control parameters and/or demand data provided to the processor. The processor is configured to generate control signals corresponding to the preferred load combination and to communicate the control signals to the transfer switch means. Finally, the transfer switch means is adapted to effect an allocation of the electrical loads between the power sources in accordance with the preferred load combination upon receiving the control signals.

Other objects and features of the present invention will be in part apparent and in part pointed out hereinafter.

BRIEF DESCRIPTION OF THE DRAWINGS

FIG. 10 is a table containing exemplary data provided to a processor in accordance with the present invention for selecting a new load combination from a plurality of possible load combinations to increase the existing generator load.

Corresponding reference characters indicate corresponding parts throughout the several views of the drawings.

DETAILED DESCRIPTION OF THE DRAWINGS

The present invention has many applications and is particularly applicable for food stores (e.g., supermarkets) which may already own an on-site generator for use in the event of a power outage. A supermarket's refrigeration system typically includes at least one electrically-driven compressor, and each compressor has an associated electrical load when running. Supermarkets also require power for electrical loads other than compressors, and the control system of the present invention is capable of selectively transferring both compressor and non-compressor loads between power sources. Thus, each discrete electrical load can be shifted back and forth between a public utility and a generator, either individually or in combination with other electrical loads.

Figure 1:
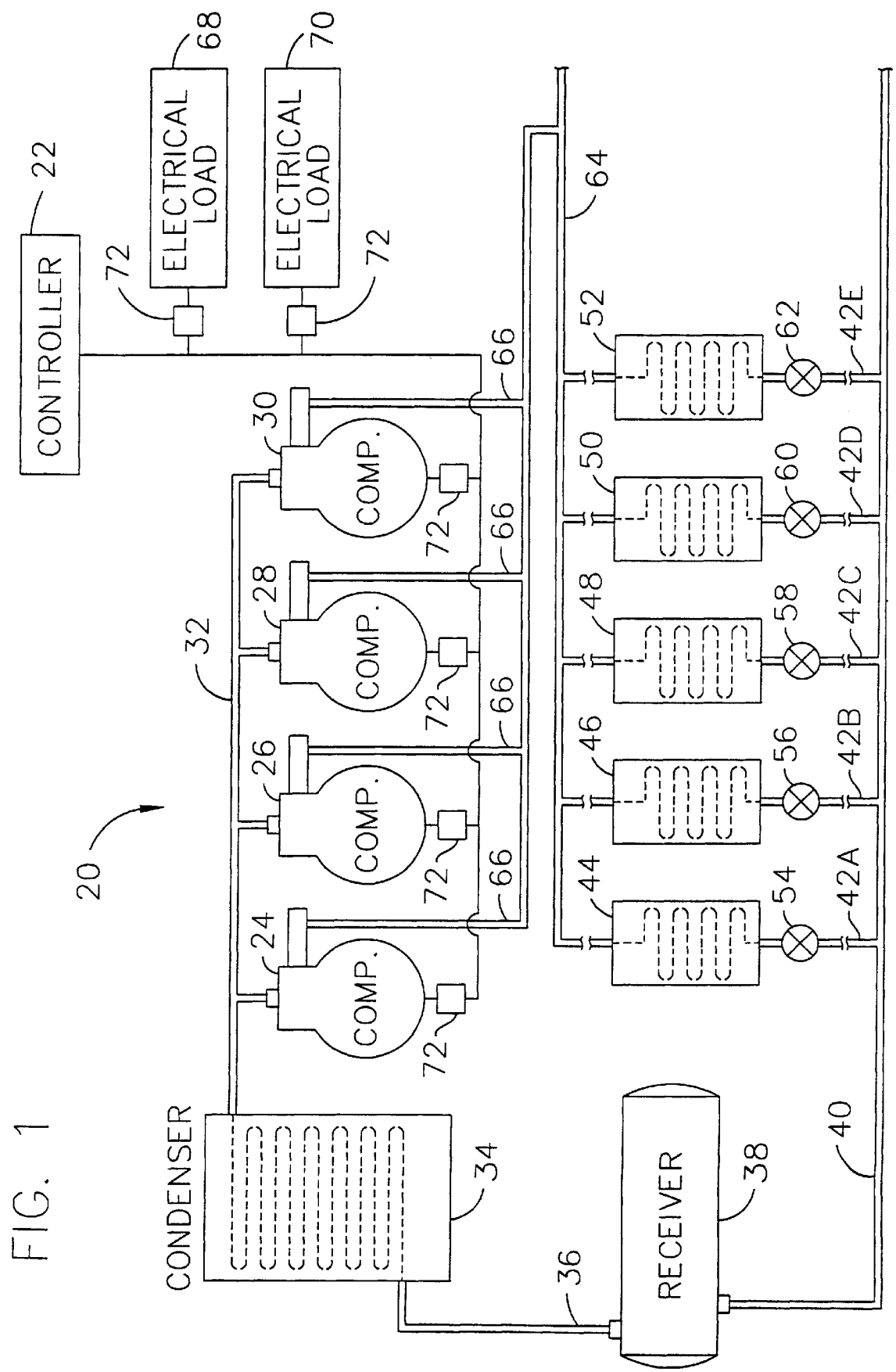
FIG. 1 is a diagrammatic illustration of a conventional, multiple compressor refrigeration system which is coupled with a load shifting controller in accordance with the present invention.

Referring now to the drawings and initially to FIG. 1, a conventional, multiple compressor refrigeration system, designated generally by reference numeral 20, is coupled with a controller 22. The refrigeration system 20 comprises four parallel compressors 24, 26, 28, 30, each of which has a suction or low pressure intake and a discharge or high pressure side with a common discharge header or conduit 32 through which hot compressed gaseous refrigerant is discharged to a condenser 34. The refrigerant is reduced to its condensation temperature in the condenser, which is connected by a conduit 36 to a receiver 38 forming a liquid refrigerant source for operating the system. The bottom of the receiver is connected to a liquid header 40 for conducting liquid refrigerant to branch liquid lines or conduits 42A–E leading to evaporator coils 44, 46, 48, 50, 52, which are representative of a multiplicity of different refrigerated fixtures. The branch liquid line for each evaporator is broken to illustrate an indeterminate length from the machine room or compressor rack to the refrigerated fixture. Expansion valves 54, 56, 58, 60, 62 are provided in the liquid lines for metering refrigerant into the evaporator coils in a conventional manner during their refrigeration cycle. The outlets of the evaporators are connected by conduits (also broken to illustrate an indeterminate length) to a common suction line or header 64 connected by compressor suction lines 66 through which vaporous refrigerant from the evaporators 44–52 is returned to the suction side of the compressors to complete the basic refrigeration cycle.

The compressors in typical refrigeration systems are often controlled in response to detected suction pressure at the compressor intake for starting and stopping the compressors. Electronic controllers are typically used whereby a suction pressure signal is brought to the controller, and the controller cycles the compressors on and off in accordance with the signal. Various control strategies for cycling the compressors are well known.

As shown diagrammatically in FIG. 1, the controller is coupled with a plurality of discrete electrical loads, including each of the compressors 24–30 of the multiple compressor refrigeration system 20 and also including two electrical loads 68, 70 which are outside the system 20. It is within the scope of the invention that the controller 22 may be coupled with fewer than all of the electrical loads shown in FIG. 1, provided that at least two separate or discrete electrical loads are coupled with the controller. For example, the controller 22 could be coupled with only the four compressors 24–30 or with only the two other electrical loads 68, 70. Similarly, the controller 22 could be coupled with any other combination of separate electrical loads (e.g., a single compressor and a single other electrical load). The term "other electrical load" is used herein to refer to another compressor in the same refrigeration system, to another compressor in a different refrigeration system, or to any non-compressor electrical load (e.g., an evaporator or condenser fan), or to other separate electrical loads in the food store (e.g. HVAC, hot table, etc.) regardless of whether it is in any refrigeration system. The transfer switches 72 which are associated with each of the electrical loads connected to the controller will be described in more detail below in connection with FIG. 3.

Figure 2:
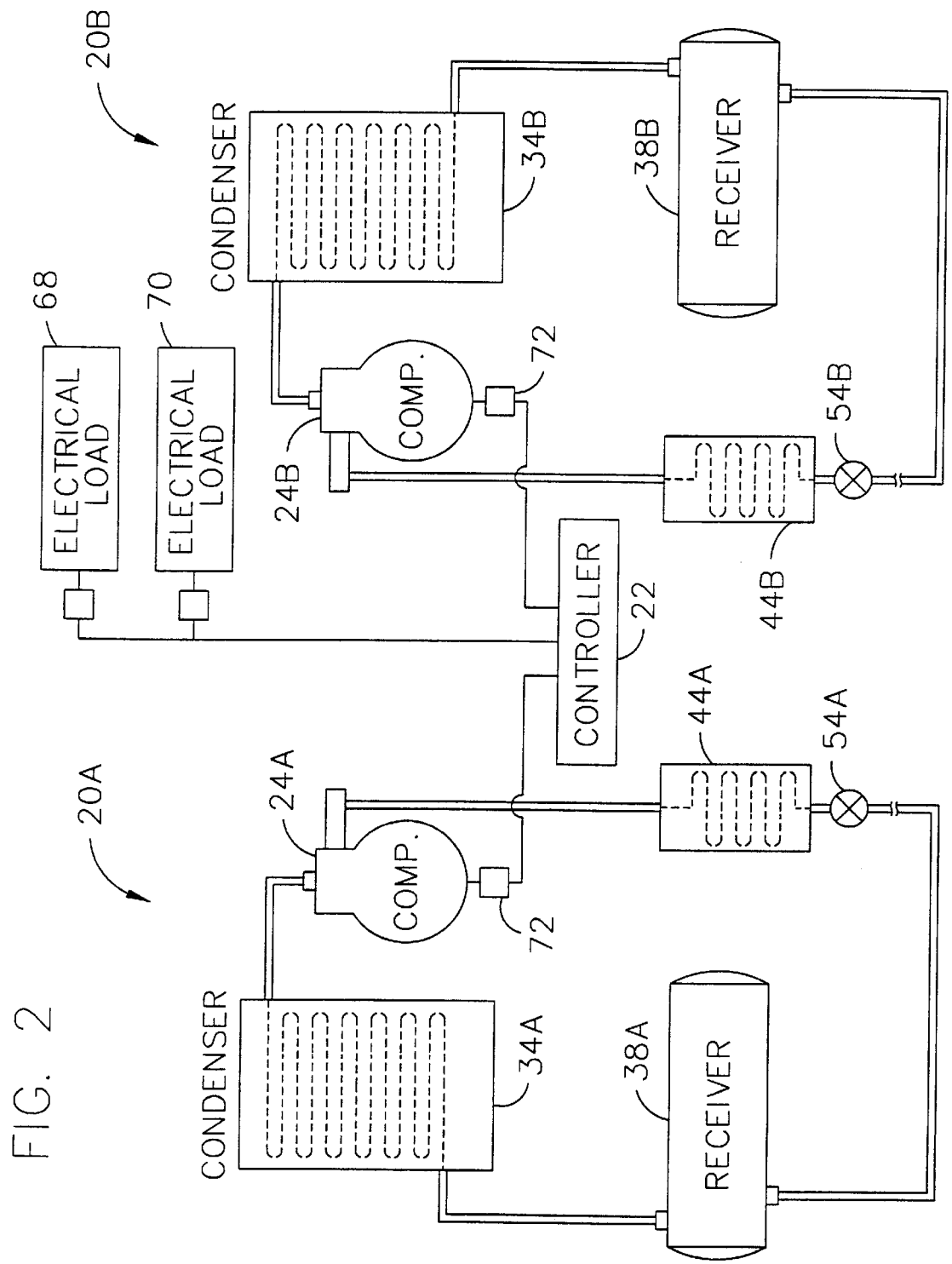
FIG. 2 is a diagrammatic illustration of two conventional, single compressor refrigeration systems which are coupled with a controller in accordance with the present invention.

Referring now to FIG. 2, the present invention may also be used in connection with single compressor refrigeration systems 20A, 20B each having one compressor 24A, 24B, one condenser 34A, 34B and one receiver 38A, 38B and each operating in generally the same manner as system 20 shown in FIG. 1. Those skilled in the art will understand the variants in commercial refrigeration and that one or more evaporators 44A, 44B (and one or more expansion valves 54A, 54B) may be connected in a conventional system or that multiple modular coils may be provided in a single fixture, as taught by U.S. Pat. No. 5,743,098.

The controller 22 shown in FIG. 2 is coupled with a plurality of electrical loads, including the compressors (24A, 24B) in the different systems (20A, 20B) and including two or more other electrical loads (68, 70) which are not part of either system. As mentioned above, the present invention contemplates a combination of at least two electrical loads coupled with the controller. Thus, the controller 22 could be coupled with both of the compressors from a pair of single compressor refrigeration systems, or the controller 22 could be coupled with the compressor of one single compressor refrigeration system and coupled with one or more other electrical loads 68, 70.

Figure 3:
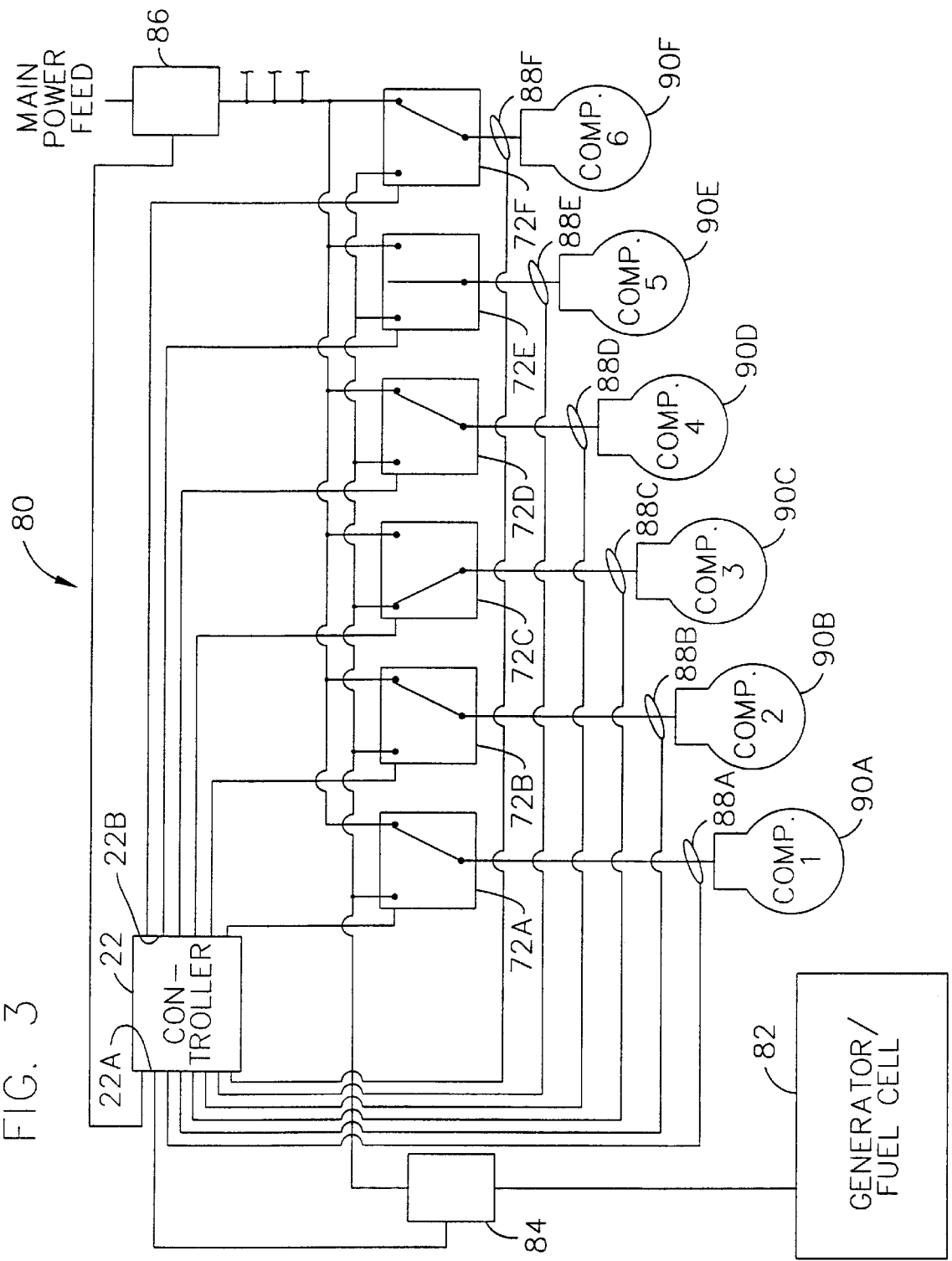
FIG. 3 is a schematic representation of a commercial refrigeration control system in accordance with a preferred embodiment of the present invention.

The control system 80 of the present invention is represented schematically in FIG. 3. The control system includes the controller unit 22 which houses a processor (e.g., the central processing unit of a personal computer). Preferably, the unit 22 has a controller input 22A coupled to both a public utility power source (MAIN POWER FEED) and a privately-owned power source 82 through a pair of power transducers 84, 86. The power transducers provide real-time or nearly instantaneous demand data (e.g., by averaging the data obtained over an entire minute where a new reading is taken every second) to the unit 22 indicating the total load demand on each power source. While the transducer 84 for the on-site generator indicates the total demand on the generator/fuel cell, the transducer 86 for the utility indicates the supermarket's total demand on the utility. Current transducers 88A–F associated with each of the individual loads 90A–F provide the controller 22 with real-time demand data for the individual loads. This real-time demand data could also be provided to the controller input 22A through power transducers. Moreover, a "rated" demand value for each load could be manually input into the processor as a default value when real-time data is not available. The unit also has a controller output 22B coupled with a plurality of transfer switches 72A–F associated with the individual compressors 90A–F for physically switching each load from one power source to the other. One advantage of the present invention is that connecting compressors to a generator through transfer switches allows some or all of the transfer switches to be moved to the "to generator" position during a blackout.

In the exemplary embodiment of the invention shown in FIG. 3, the controller 22 is coupled with six compressors 90A–F representing at least one supermarket refrigeration system. That is, all six compressors could be part of the same multiple compressor refrigeration system, or the compressors could be from as many as six separate refrigeration systems. In any event, transfer switches 72A–F associated with each of the compressors 90A–F are selectively coupled by the controller with the utility or with the generator/fuel cell 82. As those skilled in the art readily appreciate, the secondary power source could be any number of different types of power sources, including a generator, a fuel cell or a battery. To simplify the description of the disclosed embodiment, the generator/fuel cell 82 will be referred to hereinafter simply as the generator. For purposes of illustrating a preferred embodiment, this secondary power source 82 is an engine-driven synchronous generator powered by natural gas.

As can be seen in FIG. 3, each of the transfer switches 72A–F is operable between a first position in which its associated load is connected to the utility power source and disconnected from the generator 82 (e.g., switches 72A–B, 72D and 72F) and a second position in which its load is connected to the generator 82 and disconnected from the utility (e.g., switch 72C). The load(s) connected to a transfer switch are referred to herein as a "discrete load" (e.g., two compressors connected to a single transfer switch is a discrete load). It has been found that a pair of conventional, three phase mechanical contactors joined together (i.e., mechanically and electrically interlocked) can be used as a transfer switch in accordance with the present invention. These inexpensive transfer switches add to the safety of the inventive system because energizing one contactor locks out the other contactor and makes it physically impossible for a load to be connected to both the utility and the generator at the same time. Preferably, the transfer switches are equipped with adjustable time delay relays. The transfer switches will also have a "neutral" position (see switch 72E in FIG. 3) in which the load is temporarily disconnected (e.g., for 5–10 seconds) from both the utility and the generator. This neutral position allows the motor to coast to a stop before being connected to the generator, and thereby avoids excessive current transients which may trip overcurrent protection devices or damage motors. As discussed further below, the processor of the present invention is adapted to select a preferred combination of loads regardless of whether the transfer switches have a neutral position.

Figure 4:
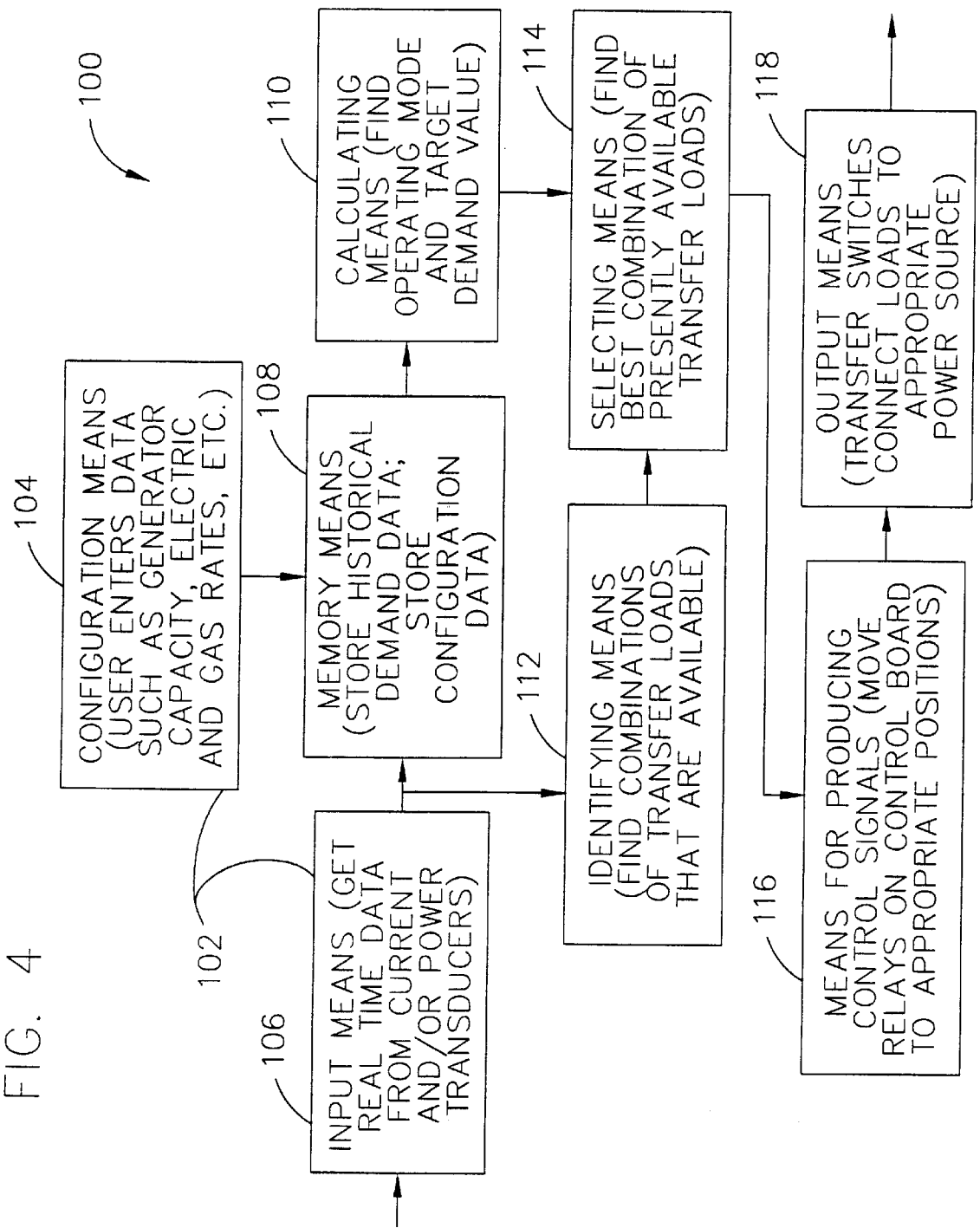
FIG. 4 is a block diagram illustrating the logical structure of a processor for use with the control system of FIG. 3.

With reference to FIG. 4, a processor 100 of the present invention is configured for selecting a combination of discrete electrical loads (e.g., compressors) from a plurality of possible load combinations. To this end, the processor 100 includes means 102 for receiving control parameters and/or demand data associated with the discrete loads and the power sources. Preferably, the receiving means 102 includes both configuration means 104 (e.g., a user interface) for receiving control parameters and input means 106 (e.g., an interface for a transducer) for receiving demand data associated with the discrete loads and the power sources.

The information received by the processor 100 is forwarded to memory means 108 for storing the control parameters as well as the demand data associated with the compressors and power sources. The control parameters may include the per unit energy rates charged by the utility, the per unit energy cost for operating the generator (maintenance cost plus fuel cost), peak demand charges assessed by the utility, and any other parameters that may be taken into account in selecting an optimal allocation of the individual loads between the power sources. Such "other" parameters could include the maximum capacity of the generator, a target value for generator run time, and the generators fuel use at various loads. Some of these control parameters are likely to remain fixed (e.g., generator capacity), and others are likely to change periodically (e.g., per unit energy cost). Thus, the memory means 108 stores both dynamic data (e.g., real-time data) and static data (e.g., fixed control parameters).

The processor 100 also includes means 110 for calculating a target demand value as a function of the control parameters and/or demand data. The term "target demand value" is used herein to describe a setpoint which represents the optimum demand on one of the power sources (e.g., the utility) beyond which any additional demand is shifted to another power source (e.g., the generator). The preferred embodiment of the present invention contemplates two modes of operation for the processor, and the appropriate mode of operation must be identified before the target demand value can be determined. Mode 1 is implemented when the cost of generating energy on-site is lower than the utility, and demand is shifted to the generator up to the maximum generator capacity (subject to certain other parameters described hereinafter). Mode 2 is in effect when the utility's energy rates are lower than the on-site energy cost, and demand is shifted to the generator only for peak shaving purposes. The key difference between these modes is that in Mode 1 both maximum energy (KW-hours) and peak power (KW) are shifted from the utility to the generator, but in Mode 2 maximum peak power but only minimum energy are shifted from the utility to the generator. The mode is determined by first calculating the on-site energy rate, including maintenance costs, and comparing it to the present utility energy charge.

After determining which mode is applicable (Mode 1 or Mode 2), the calculating means 110 evaluates the demand data and the control parameters stored in the memory means to calculate a target demand value. As described below, the target demand value selection is based on maximum net savings, target generator run time, and/or the rate of change of net savings (i.e., the point of diminishing returns). For purely economic reasons, the setpoint which would yield the maximum net savings could be selected as the target demand value. For example, if the total demand is 300 KW and the maximum loading capacity of the generator is 100 KW, then the target demand value (representing the maximum desired load on the utility) would be between 200 KW and 300 KW. As described more fully hereinafter, the processor compares the total energy cost (for both the utility and the generator) at a finite number of potential setpoints within this range. If only net savings is considered the processor would select the setpoint value with the maximum net savings as the target demand value.

A non-economic factor which is preferably used in selecting the target demand value (notwithstanding maximum net savings) is target generator run time. Since generator maintenance costs are included in the net savings calculation, target generator run time merely represents a preference to limit the generator run time for convenience or some other non-economic reason. If a maximum generator run time is selected, the processor will select as the target demand value the setpoint having the greatest net savings among those setpoints which do not exceed the maximum generator run time.

Figure 5:
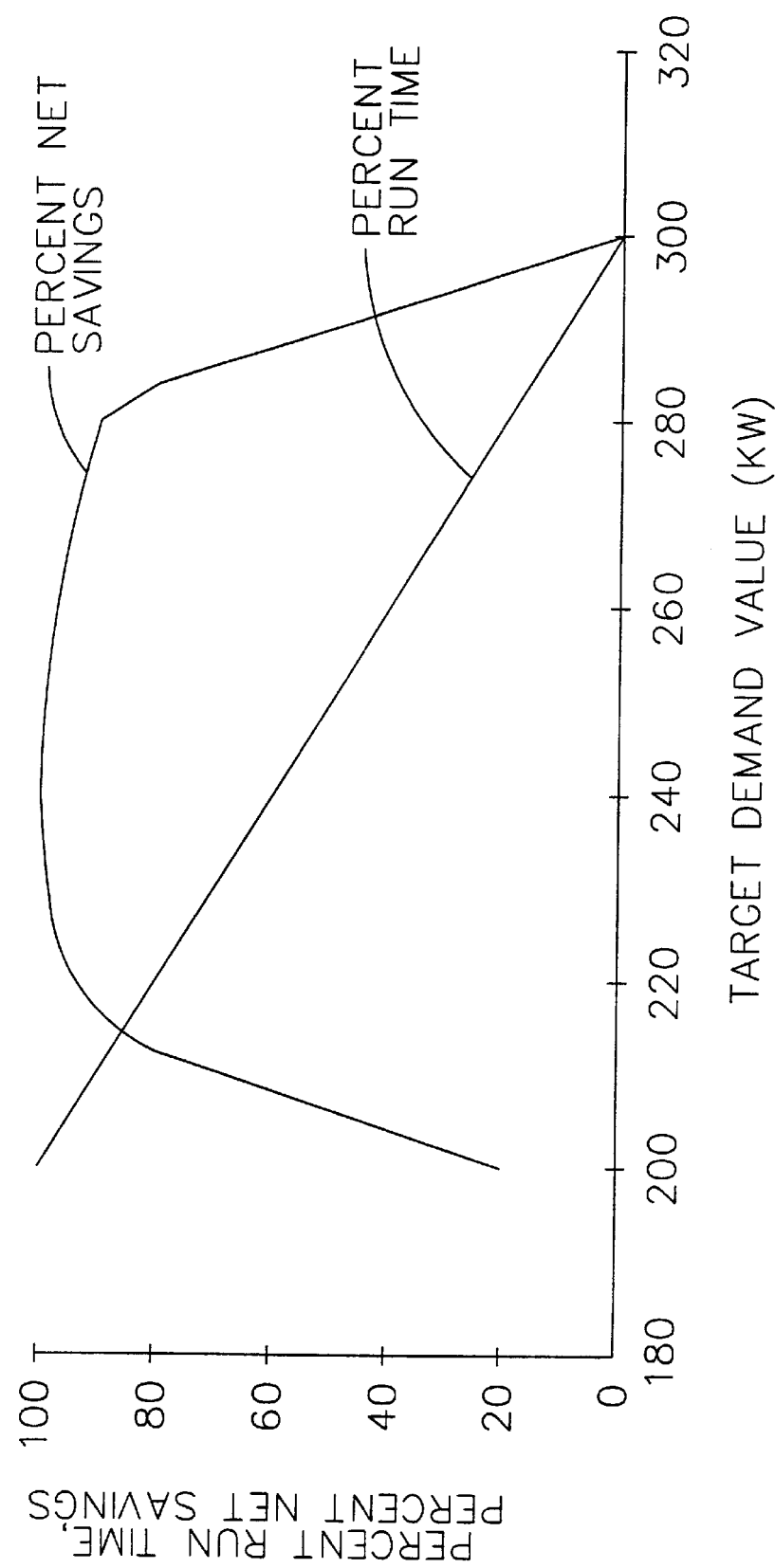
FIG. 5 is a graph containing exemplary data for a utility customer and illustrating the percent net savings relative to both the percent run time of a second power source and the target demand value for the control system of FIG. 3.

FIG. 5 illustrates the effect of another factor, the rate of change of net savings. By tracking the rate of change of net savings for each potential target demand value, a point of diminishing returns for net savings can be reflected in the calculation of the target demand value. In the example shown in FIG. 5, a target demand value of 240 KW would result in 100% of the maximum net savings but requires running the generator 60% of the time. By contrast, a target demand value of 280 KW would yield 90% of the maximum net savings with the generator running only 20% of the time. Thus, a target demand value of 240 KW requires the generator to run three times longer (and would significantly increase wear and tear on the generator) merely to obtain an additional 10% of net savings as compared to a target demand value of 280 KW. A preferred embodiment of the present invention contemplates such a relationship between the target demand value and the rate of change of net savings and, in this instance, would therefore select 280 KW rather than 240 KW as the target demand value. It should be noted that the relationship between percent run time and the target demand value is not necessarily a linear one but is shown as such in FIG. 5 for purposes of illustration only.

The present invention also contemplates other methods for assigning setpoint values. In a first alternative approach, the target demand value represents the maximum demand on the generator during Mode 1 operation but represents the optimum demand on the utility during Mode 2 operation. In Mode 1, the target demand value would default to the maximum generator loading capacity, unless the demand data and/or control parameters indicate that another value should be used. The target demand value for Mode 2 would be determined in the same manner as in the preferred embodiment. A second alternative to the preferred embodiment involves multiple setpoints within the same operating mode. In Mode 1, for example, the calculating means would set both a first target demand value indicating the optimum load on the utility and a second target demand value indicating the maximum load on the generator. This second alternative approach could include a control parameter whereby any excess demand is shifted to the utility once the first and second target demand values are both met (provided the generator is operating at full capacity). A third alternative approach involves three power sources (e.g., a utility, a generator and a fuel cell) and a target demand value which represents the optimum demand on a combination of two of the power sources (e.g., the sum of the demand on the generator and the demand on the fuel cell). Additional modes of operation and other methods for assigning setpoint values will be readily appreciated by those skilled in the art.

The frequency with which target demand value calculations are made may vary considerably. For example, the processor could be configured to calculate a predetermined target demand value based exclusively on historical demand data (e.g., monthly, daily or hourly). The target demand value should be calculated often enough (e.g., every 15 minutes or every hour) to ensure that the allocation of loads is optimized, especially since operating conditions may change frequently. Alternatively, real-time data could be used exclusively to dynamically determine the target demand value. However, redistributing the loads too frequently (e.g., every 30 seconds) may result in unnecessary wear and tear on the compressors and transfer switches in response to changes in operating conditions which are merely temporary. Preferably, the calculating means 110 is adapted for adjusting the target demand value so that real-time data may be used to adjust a predetermined target demand value based on historical demand data. Likewise, the processor 100 can be programmed to calculate a new target demand value upon the occurrence of a triggering event such as a substantial change in relative energy costs between the utility and the generator. For example, utility rate schedules may change during high energy usage periods.

As set forth in FIG. 4, the demand data and control parameters stored in the memory means 108 are evaluated in the processor by means 112 for identifying each of the presently available load combinations. In multiple compressor refrigeration systems, the compressors are cycled "on" and "off" to meet the refrigeration load (or maintain suction pressure), so some of the possible load combinations are unavailable when one or more compressors are turned off. Inasmuch as load shifting of refrigeration compressors is subordinate to meeting the refrigeration load, only those compressors which are presently running to meet the refrigeration load are available for load shifting purposes. Thus, the presently available load combinations evaluated by the processor for load shifting purposes are limited by the compressors which are presently running. Consequently, the existing load combination will not necessarily be one of the available load combinations since one of the compressors in the existing combination may have been turned off. Likewise, turning on one or more compressors makes additional load combinations (which include those compressors as a load) available. Thus, the processor 100 first identifies all of the possible load combinations then identifies the presently available load combinations by eliminating those combinations where a compressor is turned off.

The table in FIG. 10 contains exemplary data provided to the processor of the present invention, and the table indicates the existence of 16 possible load combinations (Combination Nos. 0–15) associated with four loads (Loads 1–4). Each of the possible load combinations can be identified by a binary number whereby each binary digit represents the status of a corresponding load (e.g., "0" indicates the load is connected to the utility and "1"indicates the load is connected to the generator). For example, Loads 1–4 are connected to the utility in load combination "0000" and connected to the generator in load combination "1111". However, in load combination "1001", Loads 2 and 3 are connected to the utility and Loads 1 and 4 are connected to the generator.

Importantly, the real-time demand data reveals that one of the loads in FIG. 10 (Load 4) has a demand of 0 KW and is therefore off or otherwise unavailable. Generally, a compressor which has been cycled off should be connected to the utility rather than the generator because of the in-rush which occurs when a compressor is turned on. Since a public utility is better equipped than an on-site generator to handle the in-rush, the processor of the present invention is preferably configured to ensure that compressors which are turned off are connected to the utility rather than the generator. Since Load 4 is connected to the generator in eight of the possible load combinations, those combinations (Combination Nos. 8–15) are not presently available. Thus, in the example of FIG. 10, the processor would identify Combination Nos. 0–7 as presently available load combinations. Obviously, the load combination which corresponds to the existing allocation of loads between the power sources is a possible load combination, but the existing load combination is not necessarily a presently available load combination because one of its loads might have been turned off.

With further reference to FIG. 4, the processor also includes means 114 for selecting one load combination (i.e., the best new combination) from among the presently available load combinations. The selecting means 114 is configured to calculate a load demand value for each of the presently available load combinations. As used herein, the term "load demand value" refers to the demand on one of the power sources (either the utility or the generator) for a particular load combination. From among the presently available load combinations, the processor 100 selects the one load combination having the highest load demand value which does not exceed the target demand value. Thus, the processor determines which one of the presently available load combinations would most closely approximate the target demand value without exceeding it. The processor can be configured to select a load combination from the presently available load combinations periodically at predetermined intervals (e.g., every hour) and/or upon the occurrence of a predetermined event (e.g., failure of one of the power sources or cycling on and off of compressors). Preferably, the selecting means 114 is adapted for calculating the demand for each discrete load as a function of real-time demand data. If so, the load combinations can be dynamically allocated between the power sources as a function of real-time demand data and/or historical demand data.

Furthermore, the selecting means 114 is preferably adapted for calculating what the demand would be on both the utility and the generator for each of the presently available load combinations. To predict the demand on the utility for each presently available load combination, the processor 100 first determines the actual demand for each individual load from the real-time demand data. Then, for each presently available load combination, the processor 100 subtracts the actual demand for each individual load in that load combination from the existing utility load. The demand on the secondary power source 82 is also conveniently calculated by summing the demand for the individual loads that would be connected to the secondary power source. Even where the target demand value represents the demand on the utility, calculating the demand on the generator is useful because, for example, it can be used for determining whether any of the load combinations would exceed the maximum loading capacity of the generator. If so, such load combinations can be summarily eliminated.

The identity of the load combination ultimately chosen by the selecting means 114 is communicated within the processor 100 to means 116 for producing control signals in accordance with the selected load combination. The producing means 116 is configured to generate a control signal indicating which loads are connected to the utility and which loads are connected to the generator. Preferably, the producing means 116 uses the same convention as the identifying means (i.e., "0000" indicates that Loads 1–4 are connected to the utility, and "1111" indicates that Loads 1–4 are connected to the generator). Preferably, the producing means 116 produces separate control signals for each transfer switch whenever a load combination is selected so that each control signal contains instructions for an individual load. It is presently preferred to provide one double throw relay per transfer switch (i.e., one side indicating "to utility" when energized and the other indicating "to generator" when energized) on a control board inside the controller 22. Alternatively, a single control signal containing instructions for all of the loads could be generated each time a load combination is selected. However, this alternative approach would require the use of "smart" transfer switches capable of recognizing which portion of the control signal contains instructions for that switch. Those skilled in the art will appreciate a number of other means for producing control signals.

In any event, the control signals are transmitted within the processor 100 to an output means 118. The output means 118 communicates the control signals to the various transfer switches, which are adapted to selectively transfer their connected loads between the power sources in accordance with the control signals to effect the selected load combination. Preferably, for the load combination "1001", the output means 118 would transmit four separate control signals (i.e., a "1" to both Load 1 and Load 4 and a "0" to both Load 2 and Load 3). Alternatively, a single control signal "1001" could be generated so that the output means would broadcast the entire control signal to all four of the loads.

In either case, the transfer switches for Loads 1 and 4 connect their respective loads to the generator, and the transfer switches for Loads 2 and 3 connect their respective loads to the utility.

Figure 6:
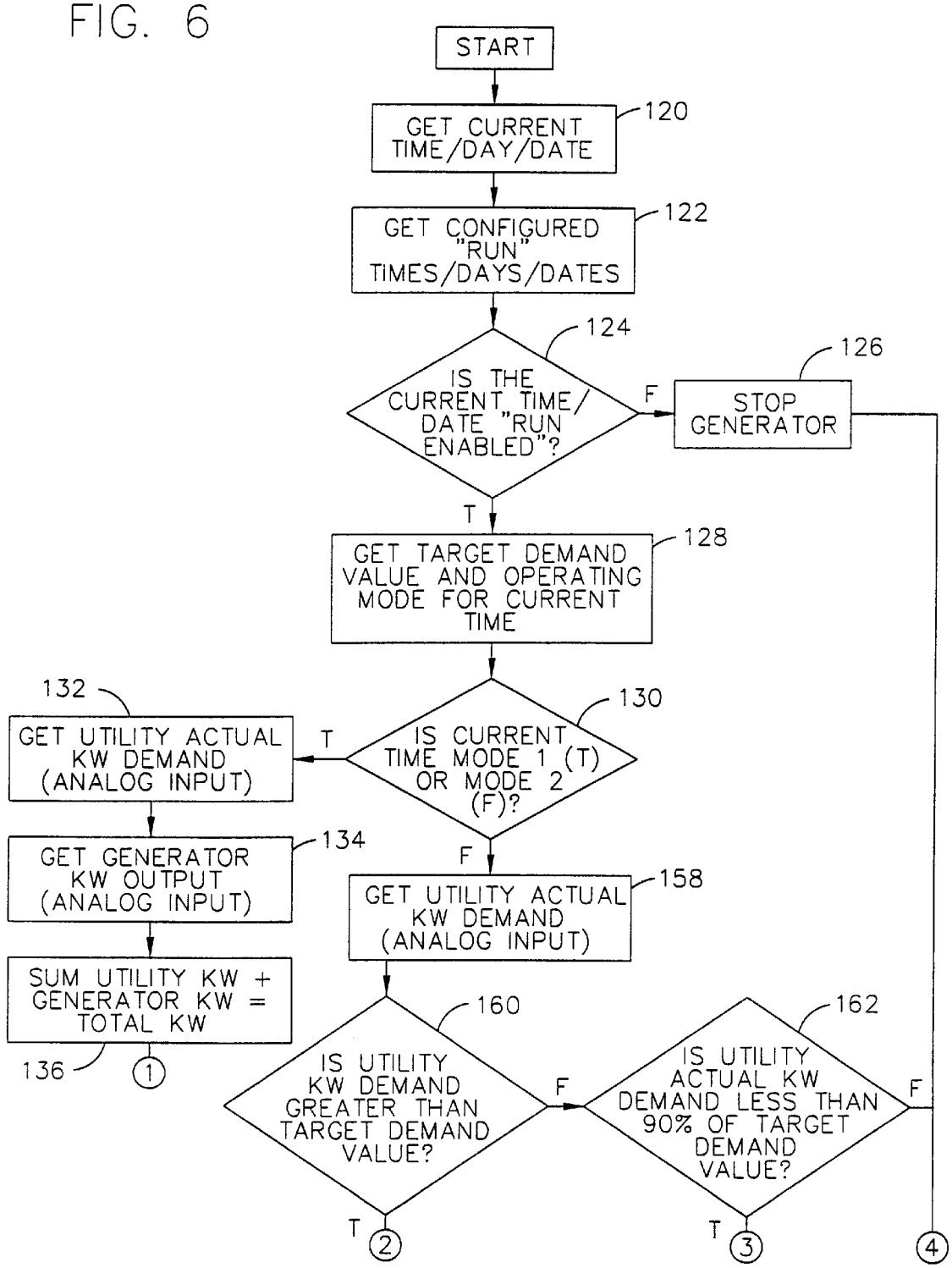
FIGS. 6 and 6A are flow charts representative of a computer program used in conjunction with the control system of FIG. 3.
Figure 6A:
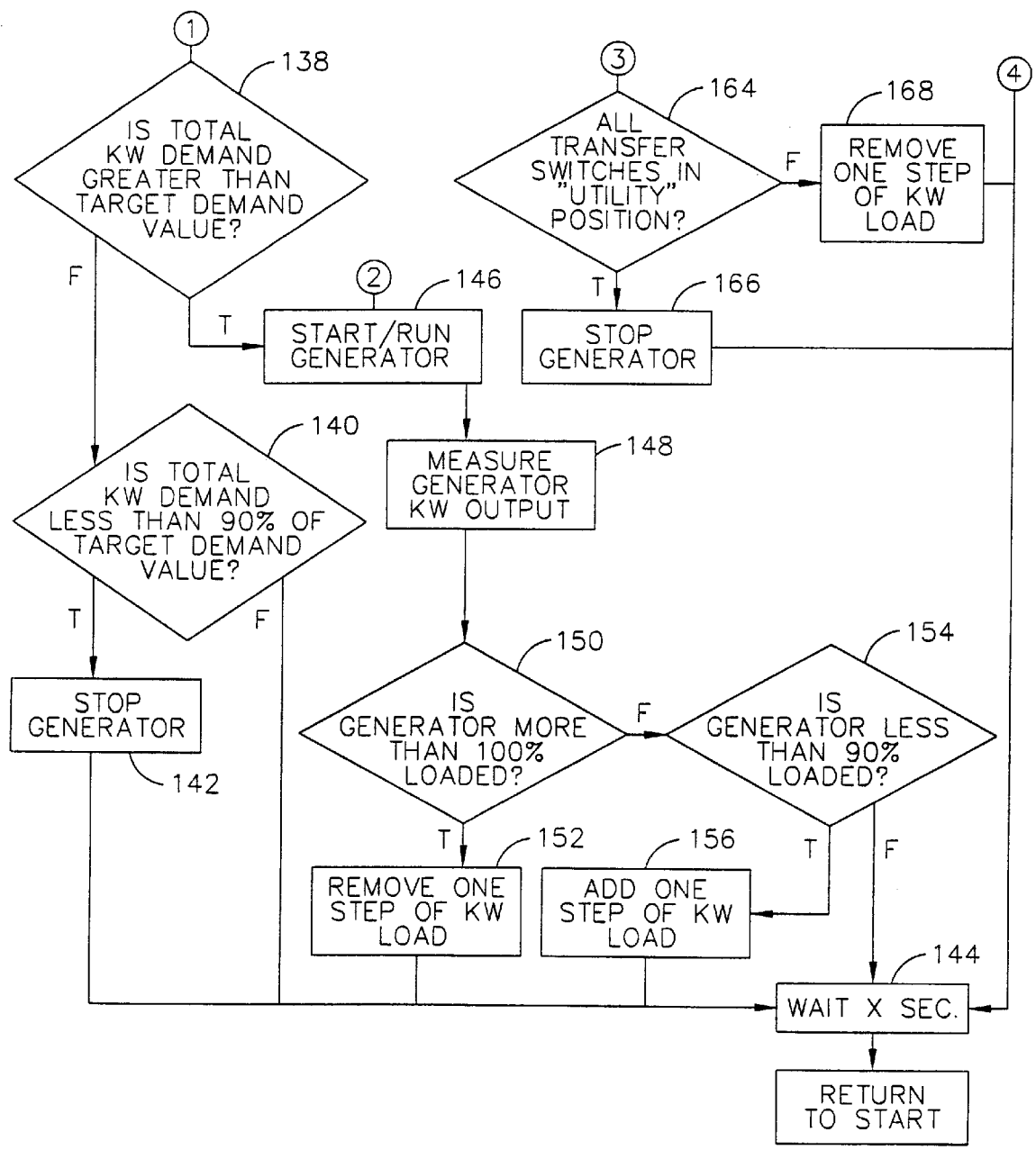

FIGS. 6–9A are flow charts representative of a presently preferred computer software program associated with the processor 100 of the present invention. Referring initially to FIGS. 6 and 6A, the flow chart illustrates a logic routine for use in a preferred embodiment of the invention in which the control system operates in either Mode 1 (full generator loading) or Mode 2 (peak shaving). Before determining whether the control system should be operating in Mode 1 or Mode 2, the processor gets the current time, day of week and date information at step 120. Then at step 122 the processor retrieves the configured "run" times, days and dates entered by the operator as control parameters and stored in the memory means. For example, the operator could configure the control system so that on every Monday in July a first set of utility rates is used from 12:00 a.m. to 8:59 a.m., a second set of utility rates is used from 9:00 a.m. to 12:59 p.m. and a third set of utility rates is used from 1:00 p.m. to 11:59 p.m.

Figure 7:
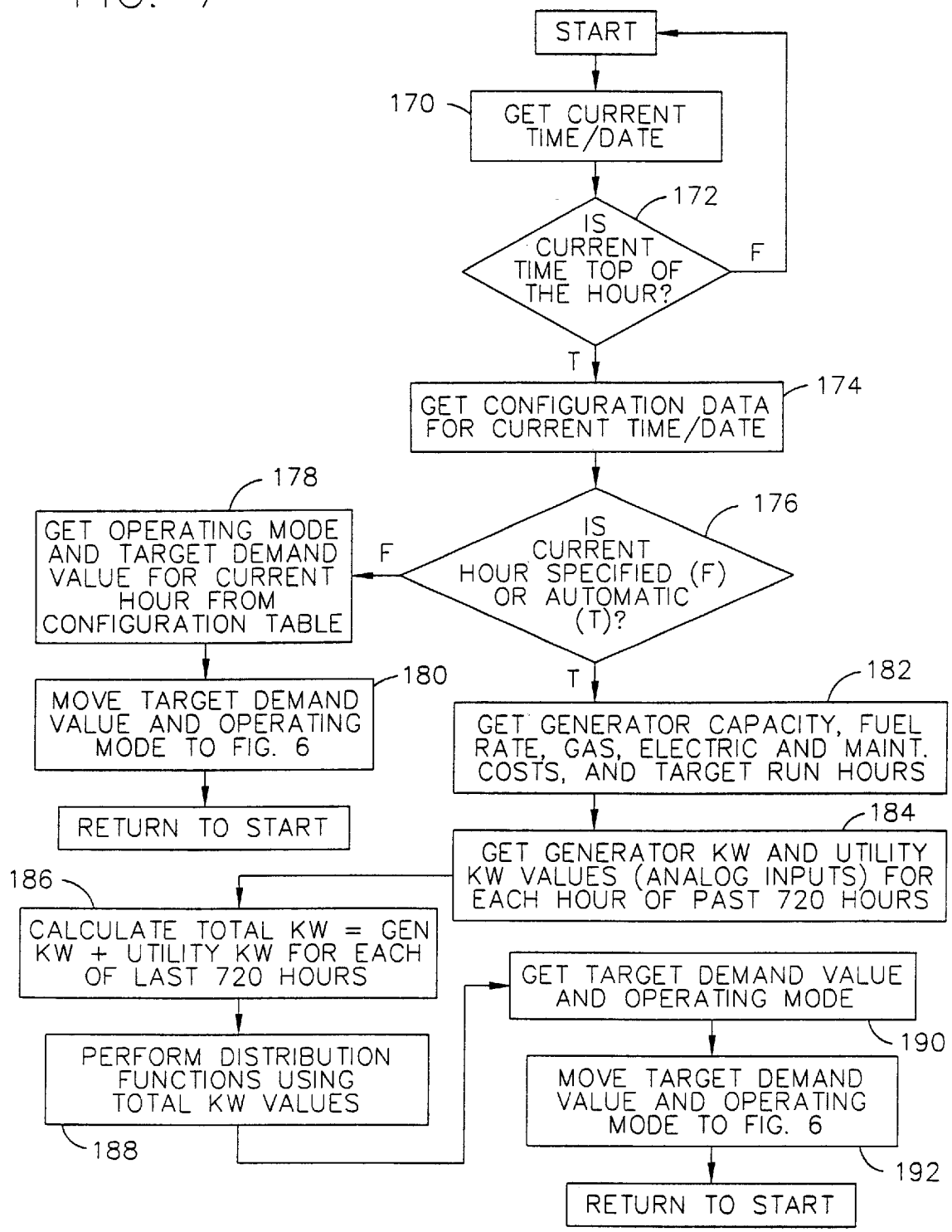
FIG. 7 is a flow chart representative of a computer program for periodically updating the target demand value in accordance with FIGS. 6 and 6A.

The processor next determines at step 124 whether the current time/day/date is "run enabled." In other words, has the control system been "enabled" by the operator to follow the control parameters? If not, the processor stops the generator at step 126 repeats steps 120–124 after waiting a predetermined period of time at step 144. If the control system is "run enabled," then the processor proceeds to step 128 and gets the target demand value and operating mode for the current time (from FIG. 7). Preferably, the target demand value is updated hourly as shown in FIG. 7.

If the processor determines at step 130 that the operating mode for the current time is Mode 1, the processor obtains the store's actual kilowatt demand on the utility at step 132, gets the generator's kilowatt output from the transducers at step 134, and calculates the total demand in kilowatts at step 136 by summing the actual utility demand and the generator output. Referring to FIG. 6A, the processor then determines whether the total demand is greater than the target demand value (for the load on the utility). This comparison ensures that the processor will not shift demand back to the utility (i.e., unload the generator) immediately after loading the generator, which can occur especially where the target demand value is relatively high. If the total demand is not greater than the target demand value, the processor next determines at step 140 whether the total demand is less than 90% of the target demand value. If so, the processor stops the generator at step 142 and then repeats the routine after waiting a predetermined period of time at step 144. Otherwise, the processor proceeds directly to step 144 and repeats the routine after a period of time without first stopping the generator. However, if it is determined at step 138 that the total demand is greater than the target demand value, the processor starts and/or continues to run the generator at step 146 and measures the generator's kilowatt output at step 148 before deciding whether the generator is more than 100% loaded at step 150. If so, then one "step" of the load is removed from the generator at step 152 before waiting a predetermined period of time to repeat the routine. A "step" of load, as used herein, refers to the nearest available load combination which has either the next highest or next lowest demand on one of the power sources as compared to the existing load combination. As used herein, "100% loaded" refers to 100% of the derated maximum capacity of the generator, which is less than the actual maximum capacity of the generator.

Thus, the generator will not be overloaded by exceeding a 100% load. If the generator is not more than 100% loaded (step 150), the processor determines at step 154 whether the generator is less than 90% loaded. If so, one "step" of kilowatt load is added to the generator at step 156 before waiting a predetermined period of time at step 144 to repeat the routine. Otherwise, the processor proceeds directly to step 144 and repeats the routine after a predetermined period of time without first adding a "step" of kilowatt load to the generator. The 90% threshold mentioned above is merely an example, and other percentages may be better suited for certain applications of the present invention.

If the processor determines at step 130 (FIG. 6) that the operating mode for the current time is Mode 2, the processor retrieves the store's actual kilowatt demand on the utility from the transducer at step 158 and determines at step 160 whether it is greater than the target demand value (for the load on the utility). If so, the processor will load the generator enough to keep the store's demand value at the target demand value, except that the processor will not permit the generator to be overloaded. Accordingly, if the target demand value is exceeded, the processor repeats the steps described above in connection with Mode 1 when the total kilowatt demand is greater than the target demand value (i.e., steps 146–156 of FIG. 6A). However, if the actual utility demand is not greater than the target demand value, the processor decides at step 162 whether the actual utility demand is less than 90% of the target demand value. If not, the processor waits for a predetermined period of time at step 144 and repeats the routine. If the actual utility demand is less than 90% of the target demand value, the processor determines at step 164 whether all transfer switches are in the "to utility" position. If so, the processor stops the generator at step 166 before waiting a predetermined period of time to repeat the routine. Otherwise, the processor removes one "step" of load at step 168 before waiting a predetermined period of time to repeat the routine.

Referring next to FIG. 7, operation of the processor is shown for both operator defined and automatically calculated target demand values. First, at step 170, the processor retrieves the current time and date. Then, the processor determines at step 172 whether the current time is the top of the hour. If not, the processor repeats the previous step. If it is the top of the hour, the processor gets the configuration data for the current time and date at step 174 and determines at step 176 whether the target demand value for the current hour is specified (i.e., operator defined) or automatically calculated. If specified, the processor proceeds to step 178 and retrieves the operating mode and target demand value for the current hour, which is stored in a configuration table in the memory means. Then at step 180 the operating mode and target demand value are provided to the routine of FIG. 6 at step 128.

However, if the target demand value for the current hour is to be determined automatically, the processor queries the memory means at step 182 (FIG. 7) for the generator capacity, the fuel rate, gas, electric and maintenance costs, and target run hours.

Then at step 184 the processor gets the values for the generator kilowatt demand and for the kilowatt demand on the utility for each hour of the past 720 hours and sums these two values at step 186 to calculate the total store power demand for each of the last 720 hours. The use of historical data as described here is merely an example, and those skilled in the art may choose to consider a different amount of historical data. The choice of 720 hours used herein is based on the fact that this approximately represents a 30 day billing cycle of the electric utility. Next, the processor performs distribution functions at step 188 and obtains a target demand value and operating mode at step 190.

Step 188 is preferably performed by a computer program which analyzes historical demand data to calculate a target demand value. The presently preferred computer program identifies the maximum and minimum total demand values (i.e., sum of target demand on the generator and demand on the utility) during the past 720 hours of operation. Then, the processor identifies an arbitrary number of potential target demand values ranging between these maximum and minimum values. If the minimum demand was 1 KW and the maximum demand was 100 KW, the processor could, for example, identify 100 potential setpoints ranging from 1 to 100 KW. Starting with the maximum value, the processor evaluates each potential target setpoint by analyzing the predicted generator run time, the rate of change of predicted net savings, and the predicted net savings for each of the potential target demand values by evaluating what the utility's energy charge, the utility's demand charge and the generator's operating costs (including fuel, maintenance and replacement costs) would be if this setpoint were used as the target demand value. It will be appreciated that net savings can be calculated in different ways. In the present embodiment, a projection of an average power (KW) which would be shifted to the generator and the generator's run time are used to calculate the utility costs avoided. When mode 1 prevails, the average power shifted is assumed to be equal to the generator capacity. However when mode 2 is in operation, the average power shifted is based on the estimated average power demand associated with the potential target demand value being evaluated less the potential target demand value. This gross savings is reduced by the cost of operating the generator. Preferably, the program takes into account the fact that generator performance (i.e., fuel consumption rate) will vary depending on the loading percentage of the generator (i.e., the generator load as a percentage of maximum generator capacity).

The program selects a target demand value upon finding any one of the following three conditions: (i) a setpoint is encountered which exceeds the maximum generator run time; (ii) a setpoint is encountered which would yield reduced savings; or (iii) a setpoint is encountered which represents the point of diminishing returns of net savings (e.g., net savings does not increase by more than 0.5% over the last potential target demand value). In each instance the processor would then select the last potential target demand value as the target demand value for the next period.

Those skilled in the art will appreciate alternative methods for performing the distribution functions in step 188. At step 192 the operating mode and target demand value are provided to the routine of FIG. 6 at step 128.

Figure 8:
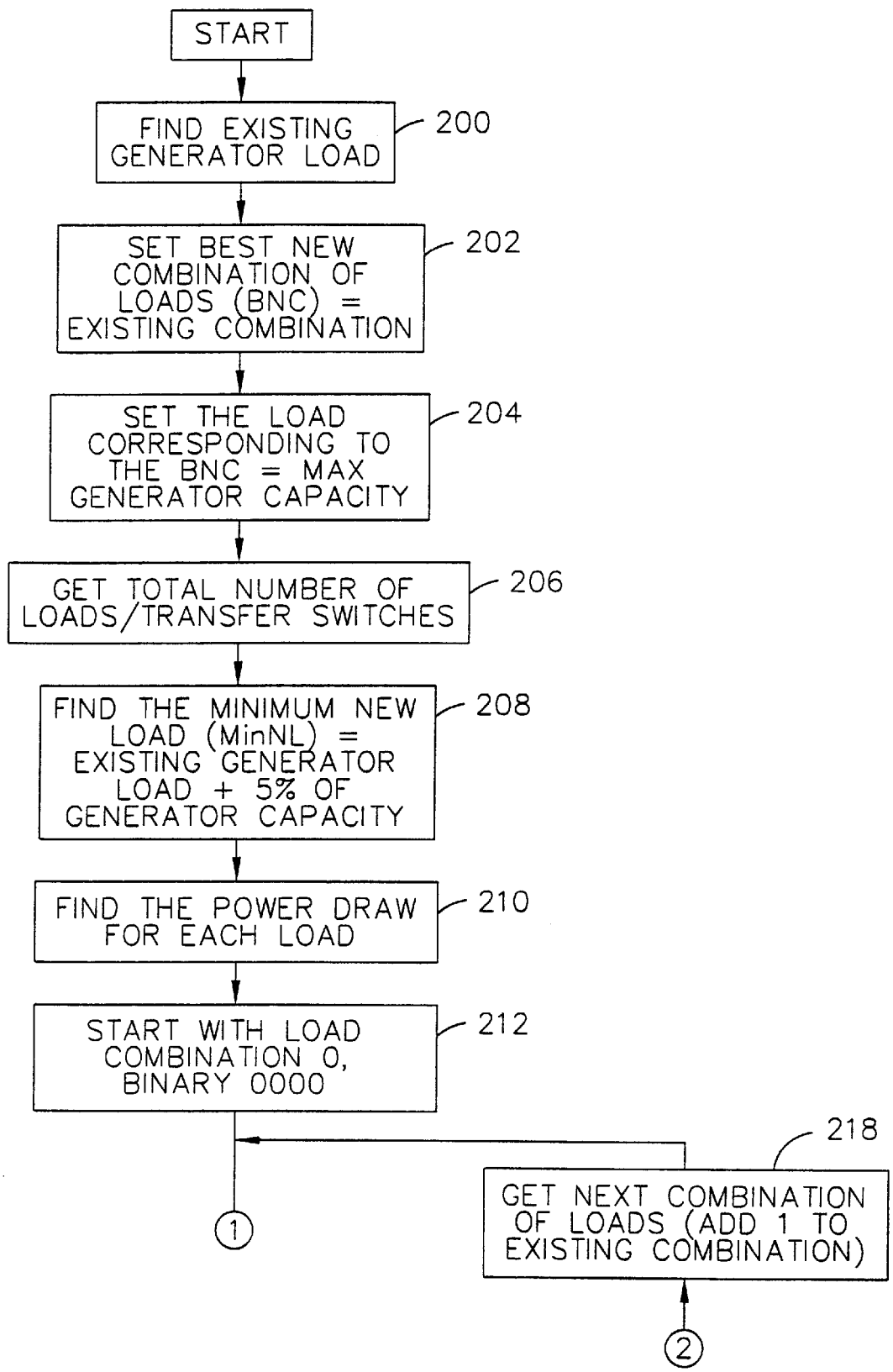
FIGS. 8 and 8A are flow charts representative of a computer program for automatically selecting a load combination to increase the existing generator load in accordance with FIGS. 6 and 6A.
Figure 8A:
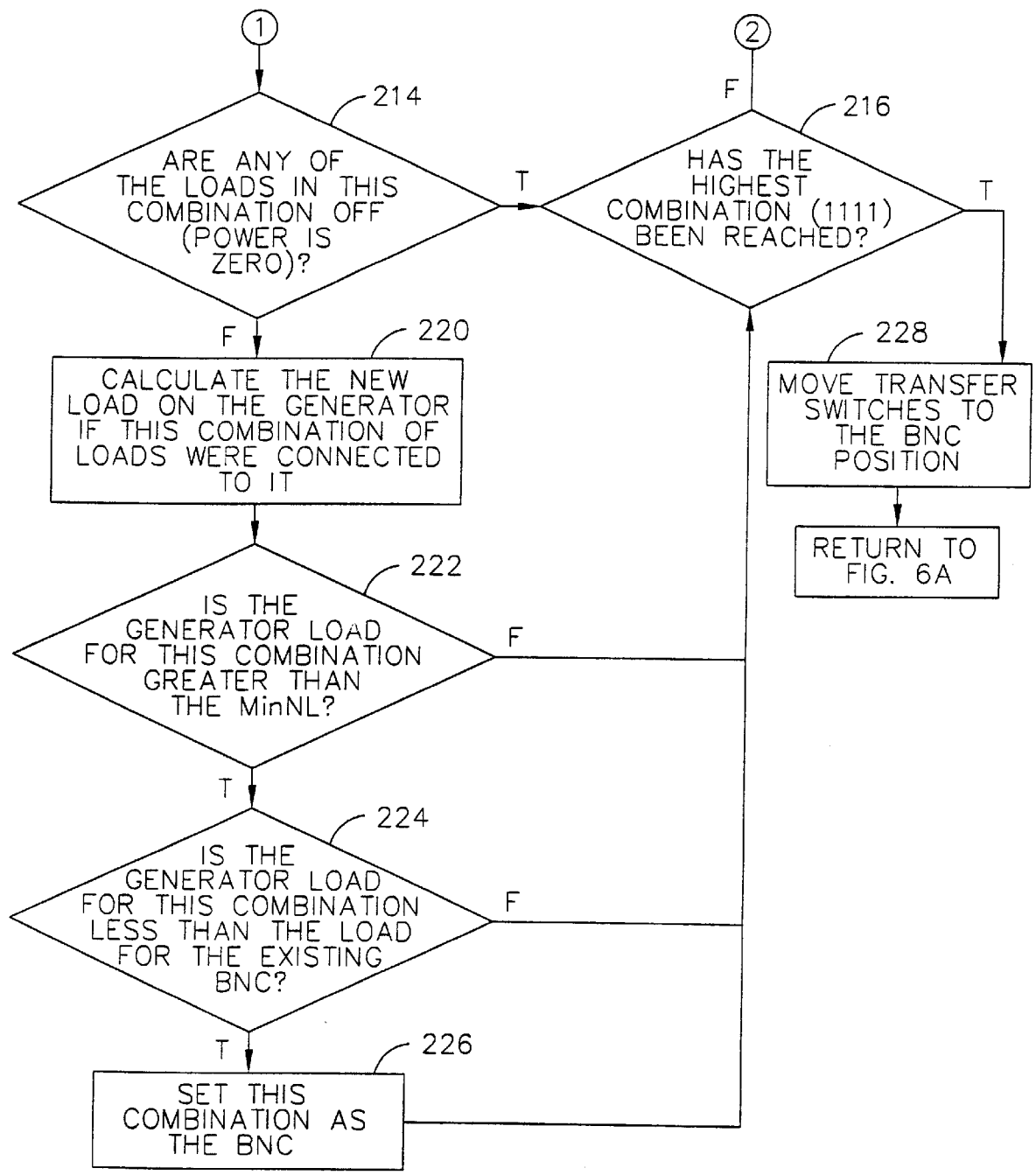

With reference to FIGS. 8 and 8A, operation of the processor is shown for selecting a load combination which increases the generator load in accordance with step 156 of FIG. 6A. The processor first reads the existing generator load from the generator's power transducer at step 200. Then at step 202 the processor initially sets the best new combination of loads (BNC) to the existing load combination and, at step 204, initially sets the load corresponding to the BNC to the maximum generator capacity (of course, the generator load which actually corresponds to the existing load combination would be less than the maximum generator capacity). At step 206, the processor obtains the total number of loads/transfer switches (e.g., four). Preferably, the processor at step 208 sets the minimum new load (MinNL) to the existing generator load plus 5% of the maximum generator capacity to eliminate load combinations that would merely provide a negligible increase to the load on the generator. Then at step 210 the current transducers associated with each load are used to calculate the power draw for each load. Preferably, the current transducers are commercially available sensing coils with a voltage input into the input means 106. As those skilled in the art will appreciate, the voltage (e.g., from a common system voltage transducer) and the phase angle are also used for calculating the power draw for each load.

At step 212, a counter is set to the first possible load combination (e.g., "0000"), and the processor determines at step 214 whether any of the loads in that combination (that would be connected to the generator) are off (i.e., power equals zero). If so, the processor increments the counter at step 218, and—unless it is determined at step 216 that the counter has reached the highest load combination (e.g., "1111")—the processor returns to step 214 to determine whether any of the loads in the second possible combination are off. Steps 214–218 are repeated until a combination is found in which all of the loads (that would be connected to the generator) are on, or until the processor has determined at step 216 that the highest load combination has been reached.

When the processor finds a combination in which all of the loads (that would be connected to the generator) are on, it will calculate at step 220 the projected new load on the generator if that combination of loads were connected to it. For example, in load combination "1110," Loads 4, 3 and 2 would be connected to the generator, and the sum of these three loads equals the projected new load on the generator for that load combination. At step 222, the processor decides whether the generator load for the new combination is greater than the MinNL. If so, the processor then determines at step 224 whether the generator load for the new combination is less than the load for the existing BNC. If so, the processor sets this combination as the existing BNC and at step 226 proceeds to determine whether it has already reached the highest load combination. However, if the total power for this combination is not greater than the MinNL (step 222) or not less than the existing BNC (step 224), the existing BNC stays the same and the processor returns to step 216 and determines whether it has reached the highest load combination. Once the highest load combination has been analyzed (i.e., 1111 in this example), the processor moves the transfer switches to the BNC position at step 228 and returns to step 144 of FIG. 6A. Preferably, the transfer switches are equipped with different time delays to prevent the generator from being simultaneously subjected to multiple starting loads.

Figure 9:
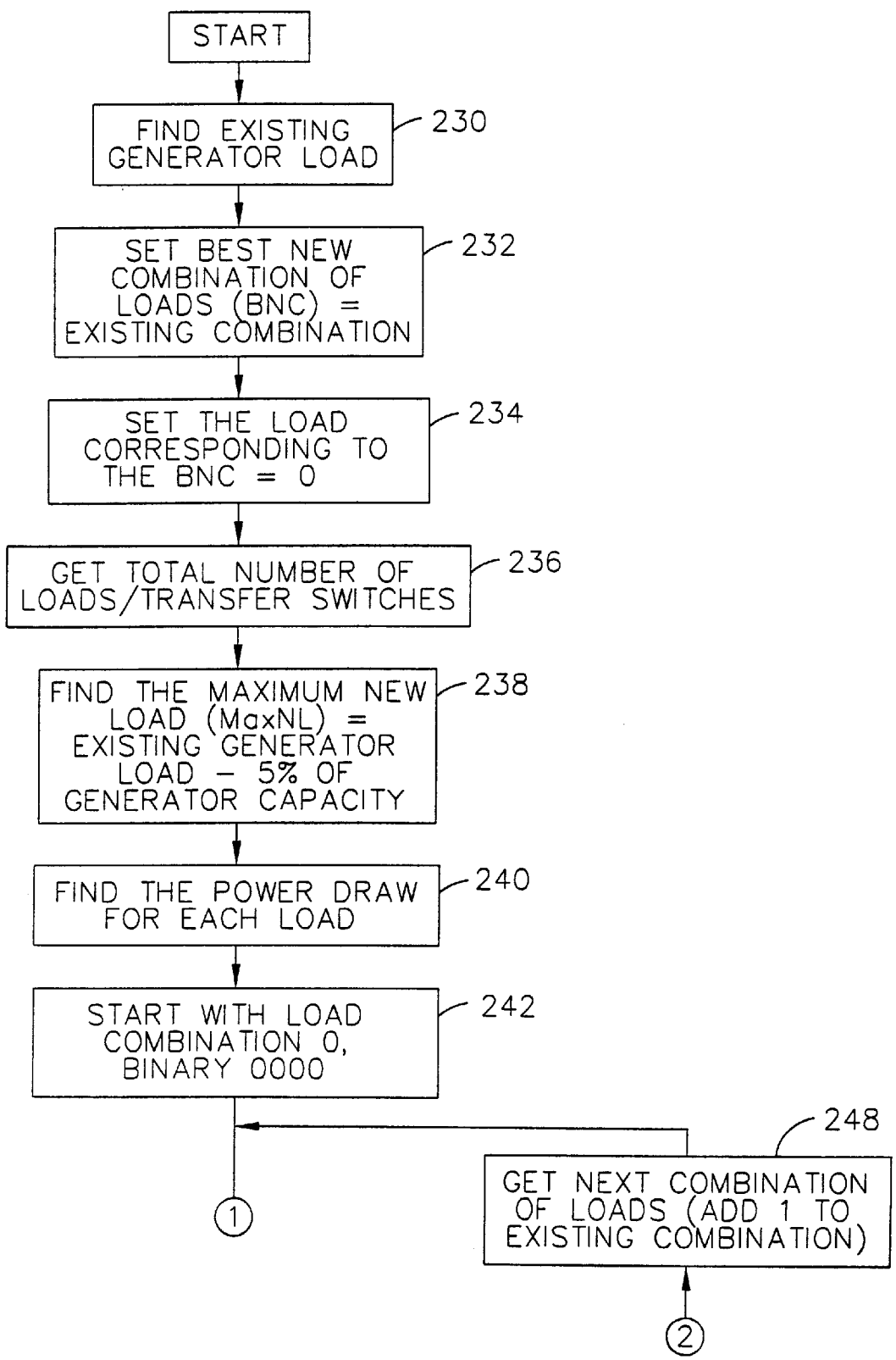
FIG. 9 and 9A are flow charts representative of a computer program for automatically selecting a load combination to decrease the existing generator load in accordance with FIGS. 6 and 6A.
Figure 9A:
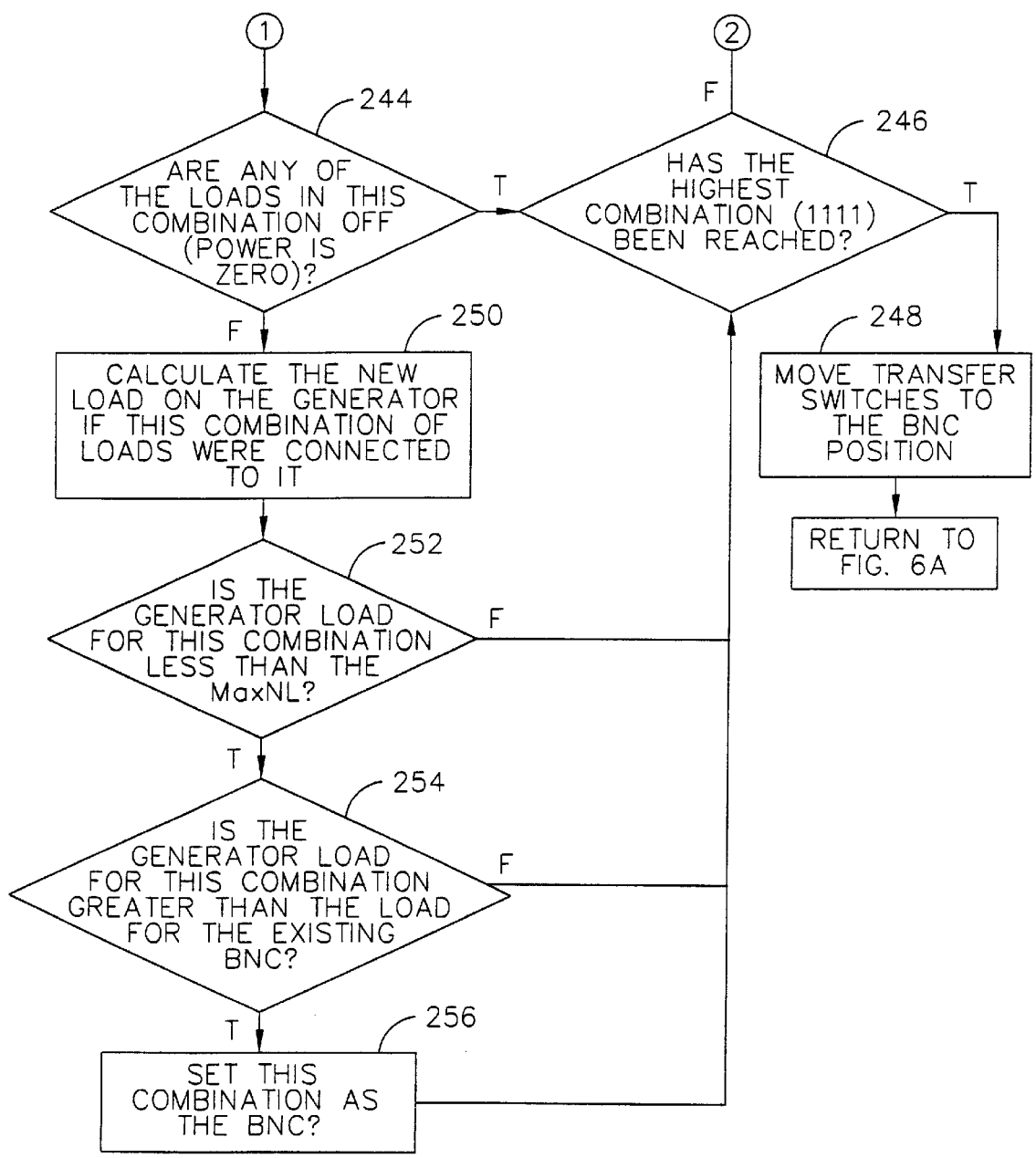

The flow chart illustrated in FIGS. 9 and 9A details the operation of the processor in selecting a load combination which decreases the generator load in accordance with steps 152 and 168 of FIG. 6A. FIG. 9 is identical to FIG. 8 with the exception of step 234, in which the load corresponding to the BNC is initially set to zero (of course, the generator load which actually corresponds to the existing load combination is not zero), and step 238, in which the processor finds the maximum new load (MaxNL) rather than the minimum new load. The MaxNL is set to the existing generator load minus 5% (for example) of the maximum generator capacity. Likewise, FIG. 9A is identical to FIG. 8A except for steps 252 and 254. At step 252, the processor determines whether the generator load for the new load combination is less than the MaxNL, and at step 254 the processor determines whether the generator load for the new load combination is greater than the load for the existing BNC. If so, the processor sets the new load combination as the BNC at step 256. As in FIG. 8A, once the highest load combination has been analyzed (as determined at step 246), the processor moves the transfer switches to the BNC position at step 248 and returns to either step 152 or step 168 (FIG. 6A).

As various changes could be made in the above constructions, products and methods without departing from the scope of the invention, it is intended that all matter contained in the above description and shown in the accompanying drawings shall be interpreted as illustrative and not in a limiting sense.

What is claimed is:

1. A processor for selecting a specific combination of discrete electrical loads from a plurality of presently available combinations of discrete electrical loads, wherein each presently available combination of discrete electrical loads represents a different allocation of the loads between a first power source and a second power source, said processor comprising:

means for receiving control parameters and/or demand data associated with the discrete loads and the power sources;

memory means for storing the control parameters and/or demand data;

means for calculating a target demand value for the demand on one of said power sources as a function of the control parameters and/or demand data;

means for identifying each of the presently available combinations of discrete electrical loads; and means for selecting one load combination from said presently available combinations of discrete electrical loads, wherein said selecting means is adapted for calculating a load demand value for each of said presently available combinations of discrete electrical loads which indicates the actual demand for that combination of discrete loads on said one power source, said one combination of discrete loads having the highest load demand value which does not exceed the target demand value.

2. The processor of claim 1 wherein said one power source is the first power source, and the first power source is an electrical utility.

3. The processor of claim 1 wherein said one power source is the second power source, and the target demand value equals the maximum loading capacity of the second power source.

4. The processor of claim 3 wherein the second power source is a generator or a fuel cell.

5. The processor of claim 1 wherein said calculating means is adapted for selecting as a function of the control parameters and/or demand data one of a first operating mode when said second power source is the less expensive source of power and a second operating mode when said first power source is the less expensive source of power.

6. The processor of claim 1 wherein said presently available load combinations include at least one of a first load combination in which all of the loads are connected to the first power source, a second load combination in which all of the loads are connected to the second power source and a third load combination in which at least one load is connected to the first power source and at least one load is connected to the second power source.

7. The processor of claim 1 further comprising means for producing control signals indicating said one load combination.

8. The processor of claim 7 further comprising output means for communicating the control signals to transfer switches connected to respective electrical loads for activating said transfer switches to selectively transfer the loads between said first and second power sources in accordance with the control signals to effect said one load combination.

9. The processor of claim 1 wherein said calculating means is adapted for adjusting the target demand value.

10. The processor of claim 1 wherein said processor is adapted to select a load combination from the presently available load combinations at predetermined intervals.

11. The processor of claim 1 wherein said processor is adapted to select a load combination from the presently available load combinations upon the occurrence of a predetermined event.

12. The processor of claim 11 wherein the predetermined event is a failure of one or more of said power sources.

13. The processor of claim 1 wherein said selecting means is adapted for calculating the demand on the first power source and on the second power source for each of the presently available load combinations.

14. The processor of claim 1 wherein the control parameters include the rate of change of net savings so that a point of diminishing returns for net savings is reflected in the target demand value.

15. The processor of claim 1 wherein said receiving means is adapted to receive demand data from a plurality of transducers associated with the discrete loads, and wherein said transducers may be current transducers or power transducers.

16. The processor of claim 15 wherein the demand data includes real-time demand data.

17. The processor of claim 16 wherein said selecting means is adapted for determining the demand for each discrete load as a function of real-time demand data.

18. The processor of claim 1 wherein the receiving means is adapted to receive demand data from power transducers associated with the first and second power sources.

19. The processor of claim 1 wherein one or more of said discrete loads are compressors in a refrigeration system.

20. The processor of claim 1 wherein the first power source and the second power source are electrically isolated from and independent of one another.

21. The processor of claim 1 wherein the first power source is a public utility and wherein the control parameters include the rates charged by the public utility, the demand for each of the discrete loads and the maximum loading capacity of the second power source.

22. A control system for selectively allocating a plurality of discrete electrical loads between a first power source and a second power source, said control system comprising:

a plurality of transfer switches connected to respective electrical loads, said transfer switches being operable between a first position in which the load is connected to the first power source and disconnected from the second power source and a second position in which the load is disconnected from the first power source and connected to the second power source; and a processor coupled with the plurality of transfer switches, said processor being configured to identify presently available combinations of said discrete electrical loads and to select a preferred one of said presently available load combinations as a function of control parameters and/or demand data provided to the processor, wherein said processor is configured to generate control signals corresponding to the preferred load combination and is further configured to communicate the control signals to said transfer switches;

wherein the transfer switches are adapted to effect an allocation of loads between the first and second power sources in accordance with the preferred load combination upon receiving said control signals.

23. The control system of claim 22 further comprising a first power circuit including the first power source and any loads connected to transfer switches disposed in said first position, and further comprising a second power circuit including the second power source and any loads connected to transfer switches disposed in said second position.

24. The control system of claim 22 wherein the first power source and the second power source are electrically isolated from and independent of one another.

25. The control system of claim 22 further comprising a plurality of current transducers adapted to provide demand data to the processor, wherein each of said transducers is associated with one of said discrete electrical loads.

26. The control system of claim 22 further comprising a plurality of power transducers adapted to provide demand data to the processor, wherein each of said transducers is associated with one of said discrete electrical loads.

27. The control system of claim 22 further comprising a first transducer associated with the first power source and a second transducer associated with the second power source for providing demand data to the processor.

28. The control system of claim 22 wherein one or more of said discrete loads are compressors in a refrigeration system.

29. The control system of claim 22 wherein the first power source is a public utility, and wherein the control parameters include the rates charged by the public utility, the demand for each of the discrete loads and the maximum loading capacity of the second power source.

30. The control system of claim 28 wherein the second power source is a generator or a fuel cell.

31. A method for selecting a combination of discrete electrical loads from a plurality of presently available combinations of discrete electrical loads, wherein each presently available combination of discrete electrical loads represents a different allocation of the discrete loads between a first power source and a second power source, said method comprising:
    providing control parameters and/or demand data associated with the discrete loads and the power sources to a processor;
    storing the control parameters and/or demand data in a memory associated with the processor;
    calculating a target demand value for the demand on one of said power sources as a function of the control parameters and/or demand data;
    identifying the presently available combinations of discrete electrical loads; and
    selecting one load combination from the presently available combinations of discrete electrical loads by calculating a load demand value for each of the presently available combinations of discrete electrical loads which indicates the actual demand for that combination of discrete electrical loads on said one power source and determining which of the presently available load combinations has the highest load demand value which does not exceed the target demand value.

32. The method of claim 31 wherein said one power source is the first power source, and the first power source is a public utility.

33. The method of claim 31 wherein said one power source is the second power source, and wherein the target demand value equals the maximum loading capacity of the second power source.

34. The method of claim 33 wherein the second power source is a generator or fuel cell.

35. The method of claim 31 wherein said calculating step further comprises selecting, as a function of the control parameters and/or demand data, one of a first operating mode when said second power source is the less expensive source of power and a second operating mode when said first power source is the less expensive source of power.

36. The method of claim 31 further comprising producing control signals indicating the selected load combination.

37. The method of claim 36 further comprising communicating the control signals to a plurality of transfer switches connected to respective electrical loads to effect the selected load combination and operating said transfer switches in response to the control signals to selectively connect the loads between said first and second power sources.

38. A commercial refrigeration system capable of allocating electrical loads in a store between at least two power sources, the system comprising:
    a compressor having an associated electrical load when running;
    a condenser coupled with said compressor in a first refrigeration system in the store;
    an evaporator coupled with said compressor and said condenser in the first refrigeration system, wherein the evaporator is disposed in a product cooling zone for cooling displayed product;
    a plurality of electrical loads in the store including the electrical load associated with said compressor;
    transfer switch means coupled with said electrical loads, wherein said transfer switch means is adapted for selectively switching at least some of said electrical loads from one of said power sources to another of said power sources; and
    a processor coupled with the transfer switch means, said processor being configured to identify a plurality of presently available combinations of said electrical loads and to select a preferred one of said presently available load combinations as a function of control parameters and/or demand data provided to the processor, wherein said processor is configured to generate control signals corresponding to the preferred load combination and is further configured to communicate the control signals to said transfer switch means; wherein said transfer switch means is adapted to effect an allocation of said electrical loads between the power sources in accordance with the preferred load combination upon receiving said control signals.

39. The commercial refrigeration system of claim 38 further comprising a second compressor having an associated electrical load when running, wherein the electrical loads associated with said second compressor is one of said plurality of electrical loads.

40. The commercial refrigeration system of claim 39 further comprising a second refrigeration system which includes said second compressor.

41. The commercial refrigeration system of claim 39 wherein said first refrigeration system includes said second compressor.

42. The commercial refrigeration system of claim 38 wherein said at least two power sources includes a generator, and wherein one of the control parameters is the maximum loading capacity of the generator.

43. The commercial refrigeration system of claim 38 wherein said at least two power sources includes a fuel cell, and wherein one of the control parameters is the maximum loading capacity of the fuel cell.

44. The commercial refrigeration system of claim 38 wherein said at least two power sources includes a public utility, and wherein the control parameters include the rates charged by the public utility and the demand of each of the discrete loads.

45. The commercial refrigeration system of claim 38 wherein said at least two power sources are electrically isolated from and independent of one another.

46. The commercial refrigeration system of claim 38 further comprising a plurality of transducers associated with said power sources for providing demand data to the processor.

47. The commercial refrigeration system of claim 38 further comprising a plurality of current transducers associated with said electrical loads and adapted to provide demand data to the processor.

48. The commercial refrigeration system of claim 38 further comprising a plurality of power transducers associated with said electrical loads and adapted to provide demand data to the processor.

49. A processor for strategizing a target load combination from a plurality of presently available load combinations, each of which represents a different potential allocation of multiple discrete electrical loads as between first and second power sources; said processor comprising:
    means for receiving and storing control parameters and/or demand data from the discrete electrical loads;
    means for identifying each of the presently available combinations of said multiple discrete electrical loads and calculating the load demand value thereof on at least one of said power sources;

means for calculating a target demand value for said one of said power sources as a function of the control parameters and/or demand data; and means for selecting a target load combination from said presently available combinations of said multiple discrete electrical loads having the highest load demand value that does not exceed the target demand value for said one power source.

50. In combination with a food store having multiple product refrigeration requirements represented by at least two discrete compressor power loads, and having at least two other discrete electrical loads, and having an outside utility power source sufficient to exceed the entire power requirements of the food store, and also having an independent on-site dedicated power source; the improvement comprising:

a processor control system for selectively re-allocating combinations of said discrete electrical loads between said on-site and outside power sources in response to control parameters and/or demand data, said processor control system comprising:

means for receiving and storing control parameters and/or demand data associated with the discrete electrical loads and the power sources;

means for identifying each of the presently available combinations of said discrete electrical loads and calculating the load demand value associated with each identified combination of discrete electrical loads;

means for calculating a target demand value for at least one of said power sources as a function of the control parameters and/or demand data; and means for strategizing an optimum electrical load allocation of the presently available discrete electrical loads between said on-site and outside power sources toward achieving operating efficiency and power cost savings.

51. The combination of claim 50 wherein the on-site power source is a generator and the outside power source is an electrical utility.

52. The combination of claim 50 wherein said calculating means is adapted for selecting as a function of the control parameters and/or demand data one of a first operating mode when said on-site power source is the less expensive source of power and a second operating mode when said outside power source is the less expensive source of power.

53. The combination of claim 50 wherein said presently available load combinations include at least one of a first load combination in which all of the loads are connected to the outside power source, a second load combination in which all of the loads are connected to the on-site power source and a third load combination in which at least one load is connected to the outside power source and at least one load is connected to the on-site power source.

54. The combination of claim 50 wherein the processor further comprises means for producing control signals indicating said one load combination, and output means for communicating the control signals to transfer switches connected to respective electrical loads for activating said transfer switches to selectively transfer the loads between said outside and on-site power sources in accordance with the control signals to effect said one load combination.

55. The combination of claim 50 wherein said calculating means is adapted for adjusting the target demand value at predetermined intervals.

56. The combination of claim 50 wherein said selecting means is adapted for calculating a load demand value for each of the presently available load combinations.

57. The combination of claim 50 wherein the control parameters include the rate of change of net savings so that a point of diminishing returns for net savings is reflected in the target demand value.

58. The combination of claim 50 wherein said receiving means is adapted to receive demand data from a plurality of transducers associated with the discrete loads.

* * * * *